F. L. & C. C. SMITH.
PNEUMATIC TIRE PROTECTOR.
APPLICATION FILED NOV. 1, 1907.
907,093.
Patented Dec. 15, 1908.
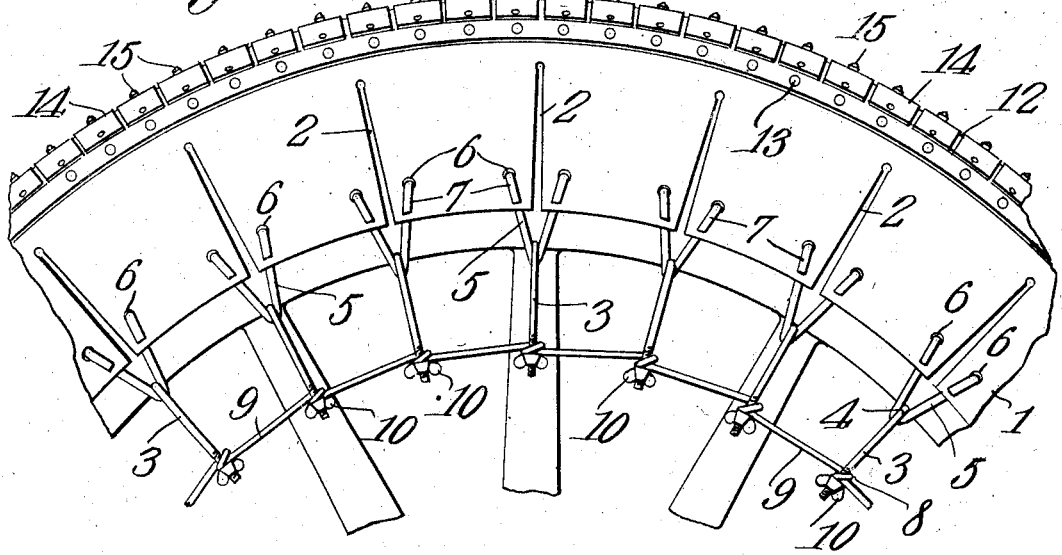
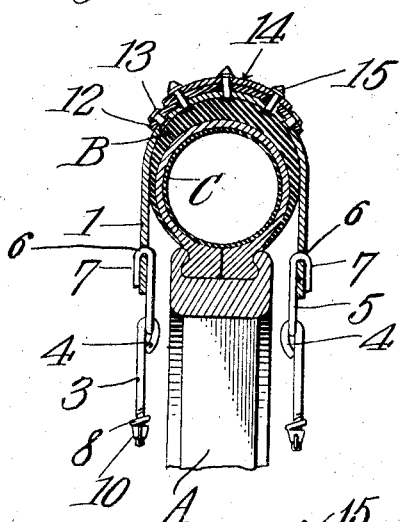
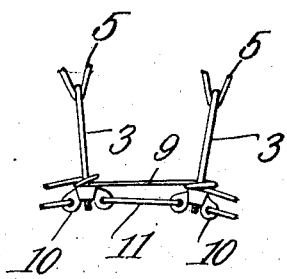
Fig. 3.
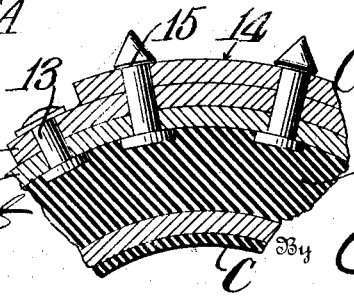
Fig. 4.
Witnesses:
E. F. Stewart
R. M. Elliott
Fred L. Smith,
Claude C. Smith,
Inventors
By C. A. Snow & Co
Attorneys.

UNITED STATES PATENT OFFICE.

FRED L. SMITH AND CLAUDE C. SMITH, OF WAHOO, NEBRASKA.

PNEUMATIC-TIRE PROTECTOR.

No. 907,093.  Specification of Letters Patent.  Patented Dec. 15, 1908.

Application filed November 1, 1907. Serial No. 400,246.

*To all whom it may concern:*

Be it known that we, FRED L. SMITH and CLAUDE C. SMITH, citizens of the United States, residing at Wahoo, in the county of Saunders, State of Nebraska, have invented a new and useful Pneumatic-Tire Protector, of which the following is a specification.

This invention relates to pneumatic tire protectors.

The object of the invention is to provide an article of this character which shall be simple in construction, durable in use, ready of application to position, and that shall be thoroughly effective in protecting the tire against tread or lateral punctures, and also against skidding.

With the above and other objects in view, as will appear as the nature of the invention is better understood, the same consists in the novel construction and combination of parts of a pneumatic tire protector, as will be hereinafter fully described and claimed.

In the accompanying drawings, forming a part of this specification, and in which like characters of reference indicate corresponding parts: Figure 1 is a view in side elevation of a portion of an automobile wheel, showing the same equipped with the improvements of the present invention. Fig. 2 is a transverse sectional view through the tire and rim portion of the wheel. Fig. 3 is a detail view of a slightly modified form of the invention. Fig. 4 is a transverse sectional view through the tire, on an enlarged scale.

Referring to the drawings, A designates the rim of an automobile wheel, B the sheath, and C the inner tube. As these parts may be of the usual or any preferred construction, further description thereof is deemed unnecessary.

The present invention resides in a novel form of pneumatic tire protector, which, as above stated, will not only prevent the tire from becoming punctured, but will also obviate skidding.

This protector comprises a sheathing 1, constructed of any material suited to the purpose, preferably heavy leather, portions of which, on each edge, are cut away to provide kerfs 2 which will permit the sheath to conform closely to the tire. The sheathing is held combined with a tire, in this instance, by a plurality of tensioning members 3, each of which is provided at one end with a hook 4 that is adapted to engage a V-shaped eye 5 the terminals of which are passed through orifices 6 disposed in pairs on each side of the kerfs, and adjacent to the walls thereof, and are rebent to provide hooks 7 by which the eyes are held against accidental disconnection from the sheathing.

The end of the tensioning member 3 opposite the hook is threaded and projects through a loop or eye 8 formed in an annular abutment 9, the projected threaded end of the tensioning member having assembled therewith a winged nut 10 by which the tensioning member may be tightened or loosened as may be desired. The annular abutment 9 is constructed, in this instance, of a length of wire, of any suitable gage, the ends of which may be secured together either by being welded, twisted, or interlinked, and at intervals in the length of the abutment equal to the distance between the tensioning members are formed the eyes 8, through which the members project.

It will be understood, by reference to Fig. 2, that the arrangement on both sides of the tire is the same—that is to say, all of the parts are duplicated.

As a means for preventing accidental loosening or separation of the nuts 10 from the tensioning member, each adjacent pair of nuts will be connected by a keeper 11, the terminals of which are secured in orifices in the wings of the nut.

Secured to the tread portion of the sheathing is a strip 12 of leather or any other suitable material constituting a backing and which is held assembled with the sheath by rivets 13, the heads of which bear against the inner face of the sheathing, and the outer ends of which carry washers. This backing carries the armor which consists of segmental armor plates 14 of sheet metal, preferably one that is resilient, and which may be either plain, as shown, or corrugated, and are assembled with the backing and sheathing by rows of rivets 15, the heads of which bear against the inner face of the sheathing and the outer ends of which project beyond the faces of the armor plates and are upset to present spurs that operate to prevent skidding. The armor plates will be as closely assembled as practicable in order to prevent puncture, and should an object, such as a nail or the like, force its way between the edges of two plates, it will be prevented from entering the tire by means of the backing and of the sheathing.

The improvements herein described are simple in character, will be found thoroughly efficient for the purposes designed and will result in the production of a highly durable, novel, and puncture-resisting form of protector.

Having thus fully described the invention what is claimed is:—

1. The combination with a pneumatic tire, and a rim carrying the same, of a sheathing spanning the rim, a backing riveted to the tread portion of the sheathing, spaced metallic armor plates riveted to the exterior of the backing and to the sheathing, hooked eyes carried by the edges of the sheathing, annular abutments disposed adjacent to the rim, and consisting of a length of wire bent upon itself at intervals to form loops, tensioning members having hooks to engage the eyes and threaded terminals to project through the loops of the abutments, and winged nuts engaging the said terminals to place the members under tension.

2. The combination with a pneumatic tire, and a rim carrying the same, of a sheathing spanning the rim, a backing riveted to the tread portion of the sheathing, spaced metallic armor plates riveted to the exterior of the backing and to the sheathing, hooked eyes carried by the edges of the sheathing, annular abutments disposed adjacent to the rim, and consisting of a length of wire bent upon itself at intervals to form loops, tensioning members having hooks to engage the eyes and threaded terminals to project through the loops of the abutments, winged nuts engaging the said terminals, and a keeper connecting pairs of the nuts to prevent accidental disconnection from the tensioning members.

In testimony that we claim the foregoing as our own, we have hereto affixed our signatures in the presence of two witnesses.

FRED L. SMITH.
CLAUDE C. SMITH.

Witnesses:
D. C. McEntee,
L. H. Lyle.